(12) United States Patent
Takagi

(10) Patent No.: US 10,603,859 B2
(45) Date of Patent: Mar. 31, 2020

(54) GUIDE DEVICE

(71) Applicants: FUJI SEIKO CO., LTD., Hashima-shi, Gifu-Ken (JP); FUJI SHOJI CO., LTD., Hashima-shi, Gifu-Ken (JP)

(72) Inventor: Chikara Takagi, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 437 days.

(21) Appl. No.: 15/505,187

(22) PCT Filed: Aug. 27, 2014

(86) PCT No.: PCT/JP2014/072426
§ 371 (c)(1),
(2) Date: Feb. 20, 2017

(87) PCT Pub. No.: WO2016/030990
PCT Pub. Date: Mar. 3, 2016

(65) Prior Publication Data
US 2017/0266901 A1    Sep. 21, 2017

(51) Int. Cl.
B29D 30/48    (2006.01)

(52) U.S. Cl.
CPC ........ B29D 30/48 (2013.01); *B29D 2030/485* (2013.01); *B29D 2030/487* (2013.01); *B29D 2030/488* (2013.01)

(58) Field of Classification Search
CPC ............. B29D 30/48; B29D 2030/487; B29D 2030/488
See application file for complete search history.

(56) References Cited

U.S. PATENT DOCUMENTS

| 1,327,170 | A | * | 1/1920 | Pratt | B29D 30/48 57/21 |
| 3,713,598 | A | * | 1/1973 | Bucholtz | H02K 15/09 242/433.3 |
| 3,846,888 | A | * | 11/1974 | Chaffee | B21F 15/06 29/56.6 |
| 4,619,397 | A | * | 10/1986 | Urban | H01L 24/06 156/580.1 |
| 2002/0166621 | A1 | * | 11/2002 | Marsden | B29D 30/48 156/187 |

(Continued)

FOREIGN PATENT DOCUMENTS

| JP | 60100369 U | 7/1985 |
| JP | 6198776 U | 6/1986 |
| JP | 5123289 A | 5/1993 |

(Continued)

OTHER PUBLICATIONS

Machine translation of JP 2006289733, retrieved from Google Patents May 30, 2019 (Year: 2006).*

(Continued)

*Primary Examiner* — Timothy Kennedy
(74) *Attorney, Agent, or Firm* — Tarolli, Sundheim, Covell & Tummino LLP

(57) ABSTRACT

A guide device includes a guideway through which a steel wire passes when the steel wire is fed to a former. The guideway includes an inner surface. At least a portion of the inner surface includes a slit or recess at a position corresponding to a direction in which the steel wire is bent.

6 Claims, 11 Drawing Sheets

(56) References Cited

U.S. PATENT DOCUMENTS

2011/0030835 A1* 2/2011 Morisaki ................ B21F 37/00
                                                    140/88
2017/0157874 A1* 6/2017 Nomura ................ B29D 30/48

FOREIGN PATENT DOCUMENTS

| JP | 10043863 A | * | 2/1998 |
| JP | 2001213574 A | | 8/2001 |
| JP | 2006-289733 A | | 10/2006 |
| JP | 2010-173131 A | | 8/2010 |

OTHER PUBLICATIONS

International Preliminary Report on Patentability for Application No. PCT/JP2014/072426 dated Feb. 28, 2017.
International Search Report for Application No. PCT/JP2014/072426 dated Oct. 21, 2014.
Japanese Office Action corresponding to Japanese Application No. 2016-545141, dated Jun. 5, 2018.

* cited by examiner

GUIDE DEVICE

RELATED APPLICATIONS

The present invention is a U.S. National Stage under 35 USC 371 patent application, claiming priority to Serial No. PCT/JP2014/072426, filed on 27 Aug. 2014; the entirety of which is incorporated herein by reference.

TECHNICAL FIELD

The present invention relates to a guide device that includes a guideway through which a steel wire passes when the steel wire is fed to a former.

BACKGROUND ART

A guide device known in the art includes a guideway through which a steel wire passes when the steel wire is fed to a former to form a bead core, which is embedded in a bead of a tire.

Patent document 1 describes an example of a guide device that is located between a feeding roller, which feeds a rubber-coated steel wire, and a former, around which the steel wire is wound. The guide device includes a tetragonal housing and a guideway, which is located in the housing. The steel wire, which is fed by the feeding roller, passes through the guideway. The feeding of the steel wire passing through the guideway limits large sagging of the steel wire between the feeding roller and the former. The steel wire is shaped, or bent, in conformance with the diameter of a bead prior to being fed to the former by the feeding roller through the guide device. The distal end of the steel wire that has been fed to the former is clamped by a clamping device that is coupled to the former.

PRIOR ART DOCUMENT

Patent Document

Patent Document 1: Japanese Laid-Open Patent Publication No. 2006-289733

SUMMARY OF THE INVENTION

Problems that are to be Solved by the Invention

While the steel wire is wound around the former, the steel wire is pulled by the former and the clamping device. Thus, when passing through the guideway, the steel wire extends straight, that is, the steel wire is not bent. After the steel wire is wound around the former a predetermined number of times, the steel wire is cut at the terminal end, that is, a portion of the steel wire that serves as the distal end of a steel wire that is next wound around the former. Consequently, the steel wire is not pulled by the former and the clamping device. This bends the steel wire in the guideway. When the steel wire is bent in the guideway, the surface of the steel wire may come into contact with the inner surface of the guideway. This applies resistance to the steel wire and twists the steel wire. When the steel wire is twisted as described above, the distal end of the steel wire is displaced from the desired position. Thus, the clamping device may fail to appropriately clamp the distal end of the steel wire.

It is an object of the present invention to provide a guide device that limits twisting of a steel wire in a guideway.

Means for Solving the Problems

To achieve the above object, a guide device of the present invention includes a guideway through which a steel wire passes when the steel wire is fed to a former. The guideway includes an inner surface. At least a portion of the inner surface includes a slit at a position corresponding to a direction in which the steel wire is bent.

In the above guide device, the steel wire does not contact the inner surface of the guideway at the portion including the slit. This limits twisting of the steel wire in the guideway.

To achieve the above object, a guide device of the present invention includes a guideway through which a steel wire passes. The steel wire is fed to a former. The guideway includes an inner surface. At least a portion of the inner surface includes a recess at a position corresponding to a direction in which the steel wire is bent.

The above guide device limits contact of the steel wire with the inner surface of the guideway at the portion including the recess. Thus, twisting of the steel wire is limited in the guideway.

Effect of the Invention

The guide device succeeds in limiting twisting of the steel wire in the guideway.

MODES FOR CARRYING OUT THE INVENTION

A bead core formation apparatus 1 according to one embodiment will now be described.

Figure 1:
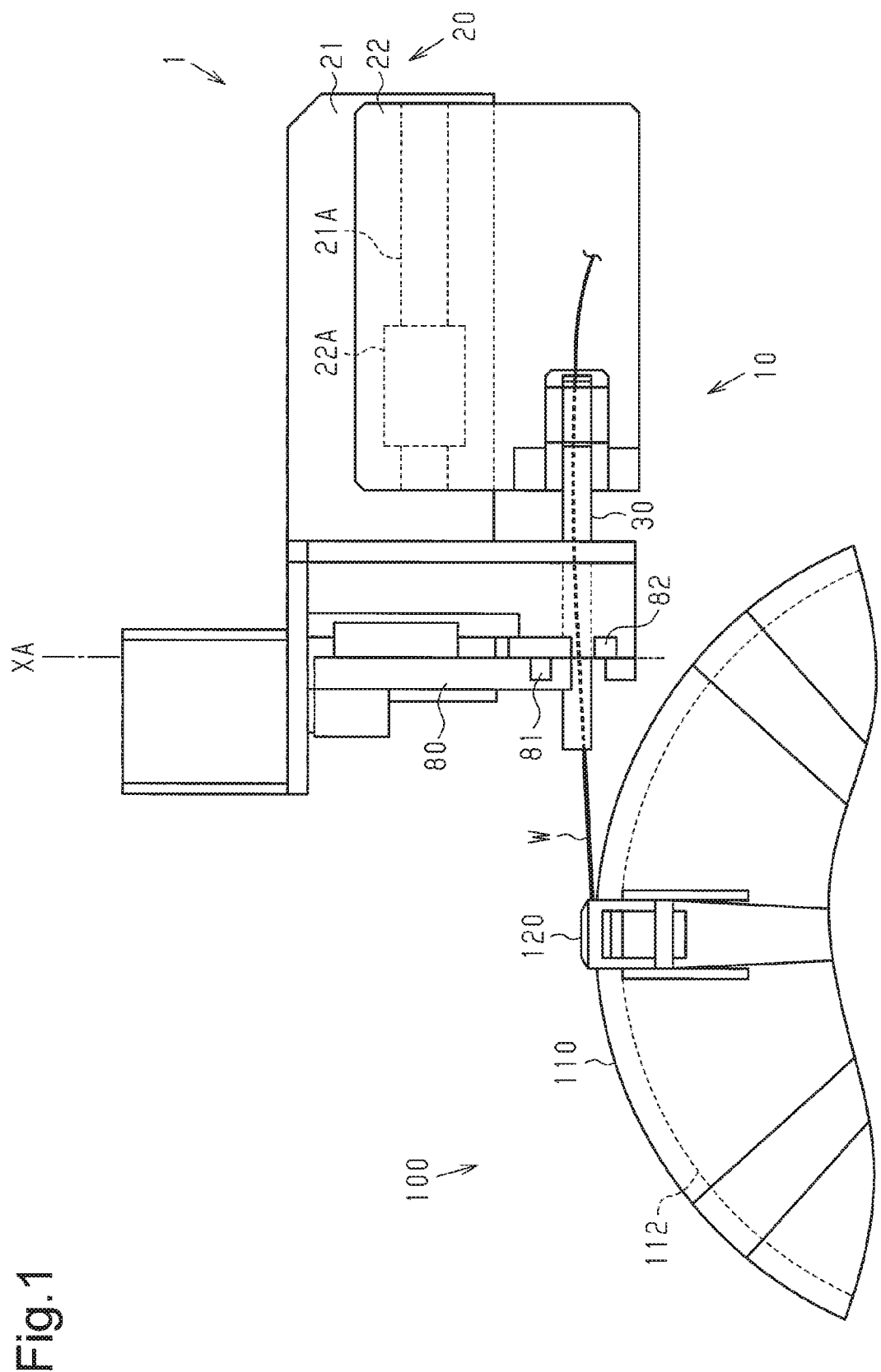
FIG. 1 is a front view showing a bead core formation apparatus according to one embodiment.

As shown in FIG. 1, the bead core formation apparatus 1 includes a guide device 10, through which a rubber-coated steel wire W passes, a cutting device 80, which cuts the steel wire W, and a winding device 100, which forms a bead core by winding the steel wire W that is fed by the guide device 10. The steel wire W is bent in conformance with the diameter of a bead prior to being fed to the guide device 10 by a feeding roller (not shown).

The guide device 10 includes a device body 20 and a steel wire passing portion 30, through which the fed steel wire W passes.

Figure 2:
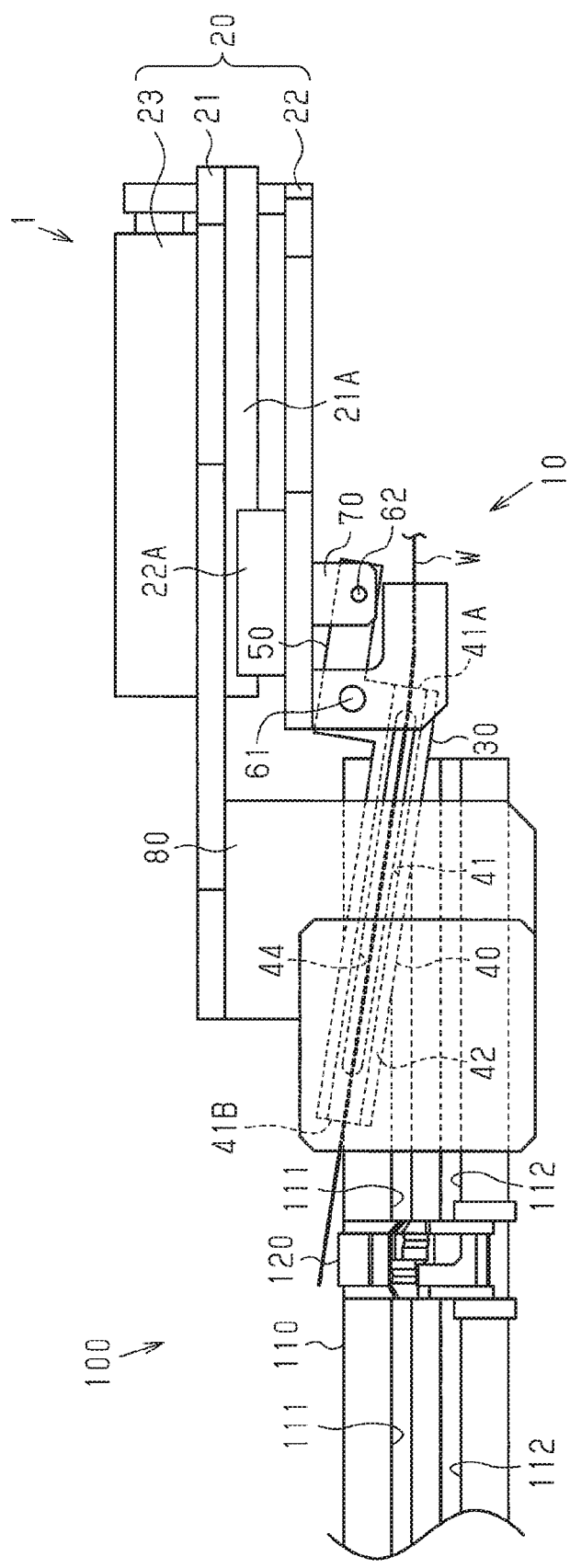
FIG. 2 is a plan view showing the bead core formation apparatus of in FIG. 1.

As shown in FIG. 2, the device body 20 includes a first support plate 21, to which the cutting device 80 is coupled, a second support plate 22, to which the steel wire passing portion 30 is coupled, and an actuator 23, which moves the second support plate 22 relative to the first support plate 21. The second support plate 22 includes a guide 22A, which is guided by a rail 21A coupled to the first support plate 21.

The steel wire passing portion 30 is connected to a piston rod 70 of a cylinder (not shown) by a connection shaft 62. The piston rod 70 is coupled to the second support plate 22. When the cylinder drives the piston rod 70, the steel wire passing portion 30 is rotated about a rotation shaft 61.

As shown in FIG. 1, the cutting device 80 includes an upper blade 81, which is attached to be vertically movable relative to the first support plate 21, and a lower blade 82, which is fixed to the first support plate 21. The upper blade 81 and the lower blade 82 cut the steel wire W at a cutting position XA after the steel wire W is wound around the winding device 100 a number of times in correspondence with the bead core to be formed.

The winding device 100 includes a former 110, around which the fed steel wire W is wound, and a clamping device 120, which is coupled to the former 110 to clamp the distal end of the steel wire W.

As shown in FIG. 2, the former 110 has a circumferential surface that includes a first winding groove 111 and a second winding groove 112, which are arranged in an axial direction of the former 110. The first winding groove 111 and the second winding groove 112 have different cross-sectional shapes in accordance with the shapes of bead cores to be formed. The steel wire W is wound around the first winding groove 111 or the second winding groove 112 to form the corresponding bead core.

Figure 3:
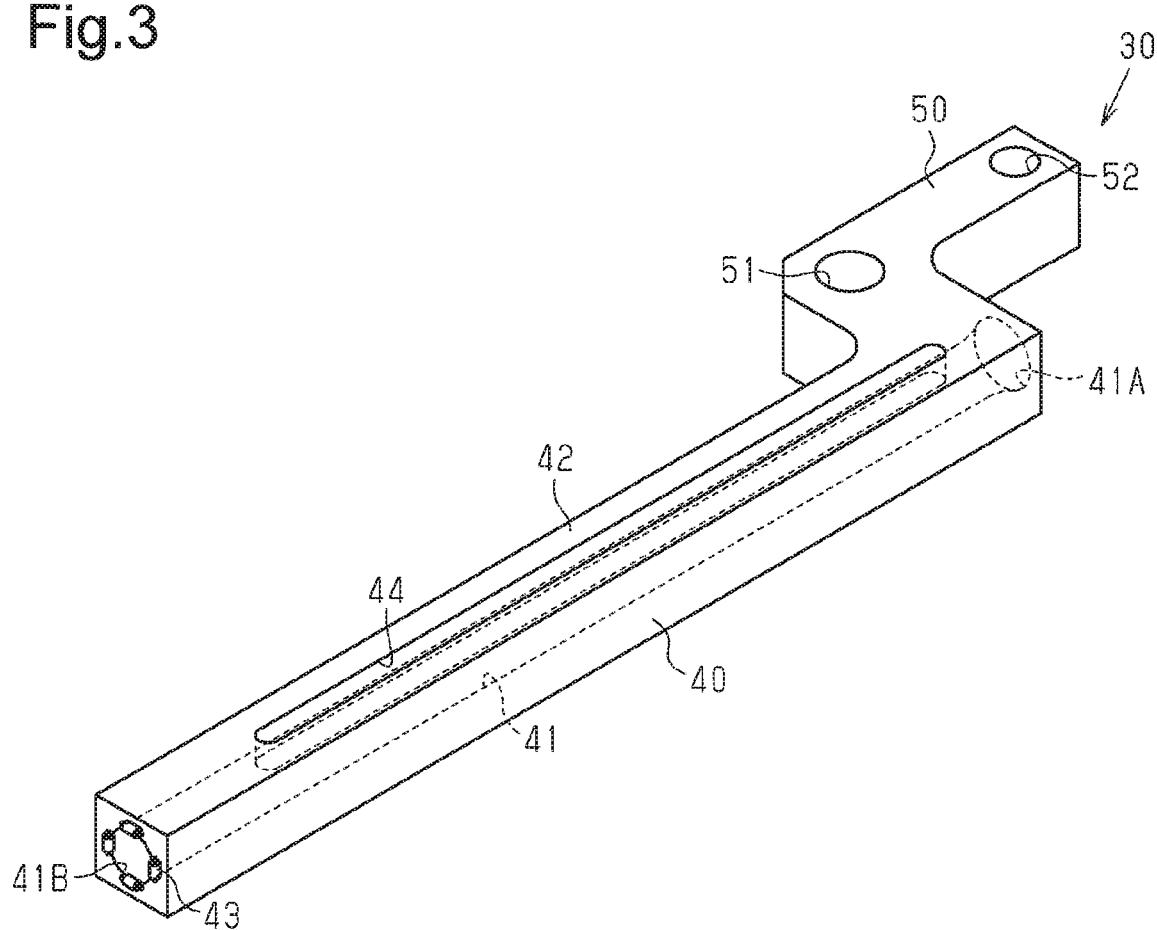
FIG. 3 is a perspective view showing a steel wire passing portion of the embodiment.

As shown in FIG. 3, the steel wire passing portion 30 includes a body 40, which includes a guideway 41 through which the steel wire W passes, and a base 50, which is continuous with the body 40.

The guideway 41 extends straight in a feeding direction of the steel wire W. The guideway 41 includes an inlet 41A, which is tapered so that the inlet 41A widens toward upstream from downstream in the feeding direction of the steel wire W.

Figure 4:
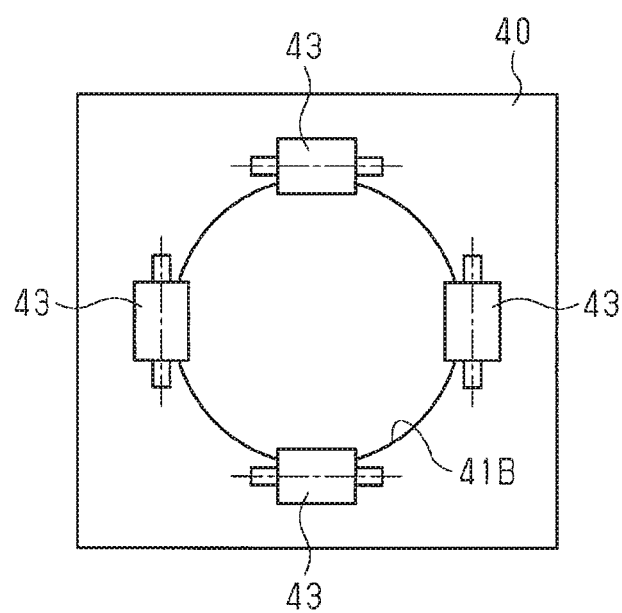
FIG. 4 is a front view showing the steel wire passing portion of the embodiment.

As shown in FIGS. 3 and 4, the guideway 41 includes an outlet 41B, to which a plurality (four in the embodiment) of miniature rollers 43 is coupled. Each miniature roller 43 is an example of a rotation element.

As shown in FIG. 3, a slit 44 extends through the body 40 between an upper surface 42 of the body 40 and an inner surface of the guideway 41. The slit 44 extends in a direction in which the guideway 41 extends. The steel wire W is, for example, bent toward the upper surface 42 to be shaped in conformance with the bead diameter prior to being fed to the guideway 41. Thus, to limit contact of the bent steel wire W with an inner portion of the guideway 41, the slit 44 extends between the upper surface 42 and the inner surface of the guideway 41 at a position corresponding to the direction in which the steel wire W is bent.

The base 50 is continuous with an end of the body 40 located close to the inlet 41A of the guideway 41. The base 50 includes a first shaft hole 51 for the rotation shaft 61 (refer to FIG. 2), which serves as the rotation center of the steel wire passing portion 30, and a second shaft hole 52 for the connection shaft 62 (refer to FIG. 2), which connects the piston rod 70 and the steel wire passing portion 30. The first shaft hole 51 is located at a position downstream of the second shaft hole 52 in the feeding direction of the steel wire W.

The structure of the clamping device 120 will now be described with reference to FIGS. 5 to 7.

Figure 5:
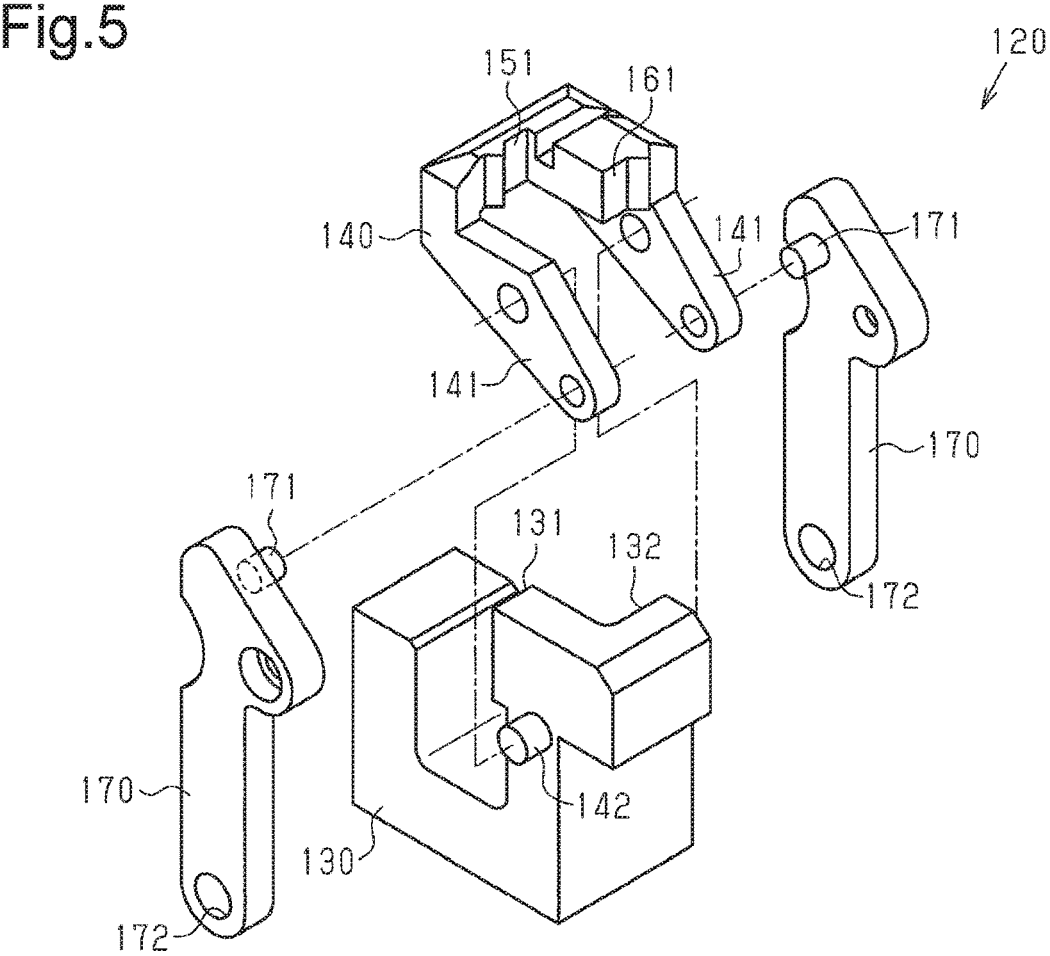
FIG. 5 is an exploded perspective view showing a clamping device of the embodiment.
Figure 6:
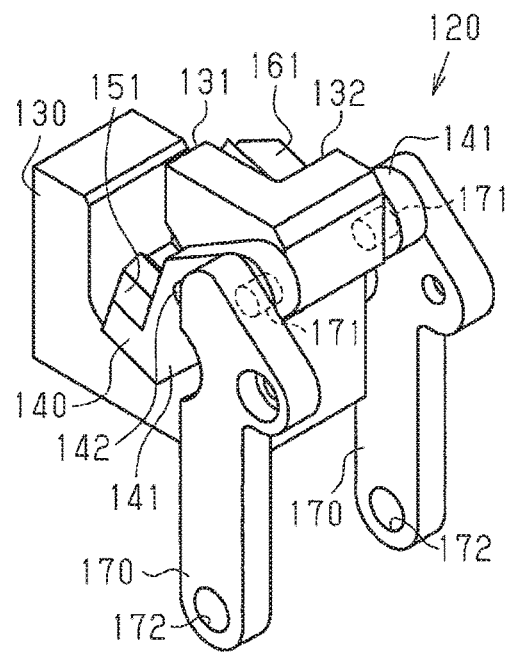
FIG. 6 is a perspective view showing the clamping device of the embodiment.
Figure 7:
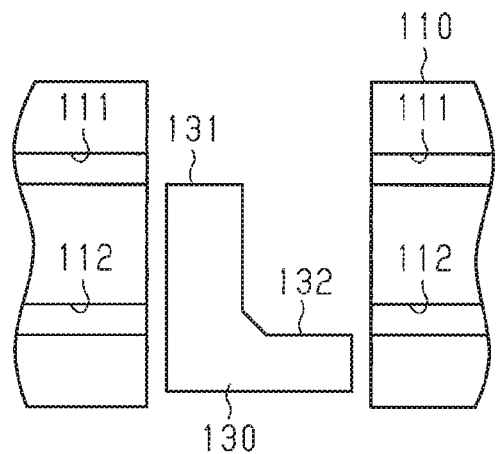
FIG. 7 is a diagram showing the relationship between first and second base walls and first and second winding grooves of the embodiment.

As shown in FIGS. 5 and 6, the clamping device 120 includes a clamp base 130, which is coupled to the former 110, a moving body 140, which is moved relative to the clamp base 130, and two moving legs 170, which are connected to the moving body 140.

The clamp base 130 includes a first base wall 131 and a second base wall 132, which are used to hold the distal end of the fed steel wire W. As shown in FIG. 7, the first base wall 131 is provided corresponding to the first winding groove 111. The second base wall 132 is provided corresponding to the second winding groove 112.

The moving body 140 includes two rotation legs 141, which are rotationally coupled to the clamp base 130 so that a portion of the clamp base 130 including the base walls 131, 132 is held between the two rotation legs 141. The rotation legs 141 are rotated about a rotation shaft 142, which is supported by the clamp base 130.

The moving body 140 includes a first clamp wall 151, which is located between the two rotation legs 141. The distal end of the steel wire W can be held between and clamped by the first clamp wall 151 and the first base wall 131 at a position corresponding to the first winding groove 111 (refer to FIG. 2).

The moving body 140 includes a second clamp wall 161, which is located between the two rotation legs 141. The distal end of the steel wire W can be held between and clamped by the second clamp wall 161 and the second base wall 132 at a position corresponding to the second winding groove 112 (refer to FIG. 2).

In the description hereafter, the position where the first clamp wall 151 or the second clamp wall 161 holds the distal end of the steel wire W, that is, the position of the moving body 140 when each clamp wall 151, 161 is opposed to the corresponding base wall 131, 132, is referred to as the clamping position. Also, the position where the first clamp wall 151 and the second clamp wall 161 do not hold the distal end of the steel wire W, that is, the position of the moving body 140 when each clamp wall 151, 161 is not opposed to the corresponding base wall 131, 132, is referred to as the non-clamping position.

Each moving leg 170 is connected to the corresponding rotation leg 141 by a connection shaft 171 so that the two rotation legs 141 are located between the two moving legs 170. Each moving leg 170 includes a hole 172. The holes 172 are rotationally connected to the distal end of an actuator (not shown).

The operation of the bead core formation apparatus 1 will now be described with reference to FIGS. 8 to 13. The former 110 is not shown in FIGS. 9 to 13.

First, the operation of the bead core formation apparatus 1 when the steel wire W is wound in the first winding groove 111 will be described.

When the piston rod 70 is retracted, the actuator 23 moves the second support plate 22 away from the clamping device 120. In this state, the steel wire W, which is bent in a predetermined shape, is fed to pass through the guideway 41 of the steel wire passing portion 30. The steel wire W is fed to a position where a predetermined length of the distal end of the steel wire W projects from the outlet 41B of the guideway 41.

Figure 8:
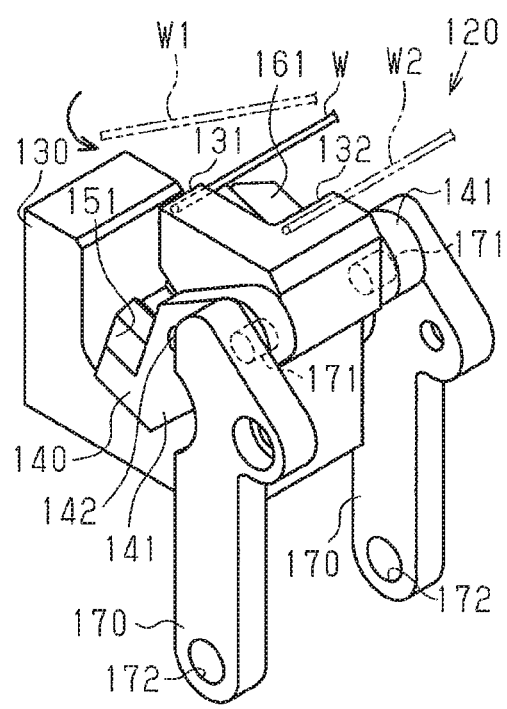
FIG. 8 is a perspective view showing the clamping device of the embodiment.

Then, the retracted piston rod 70 is moved to project from the second support plate 22, and the actuator 23 moves the second support plate 22 toward the clamping device 120. Consequently, the steel wire passing portion 30 and the steel wire W, which is held by the device body 20, are moved to the position shown in FIG. 9. This completes the positioning of the distal end of the steel wire W. At this time, as shown in FIG. 8 with a steel wire W1 indicated by a double-dashed line, the distal end of the steel wire W is located at a position separated from the first base wall 131 and the second base wall 132.

Figure 10:
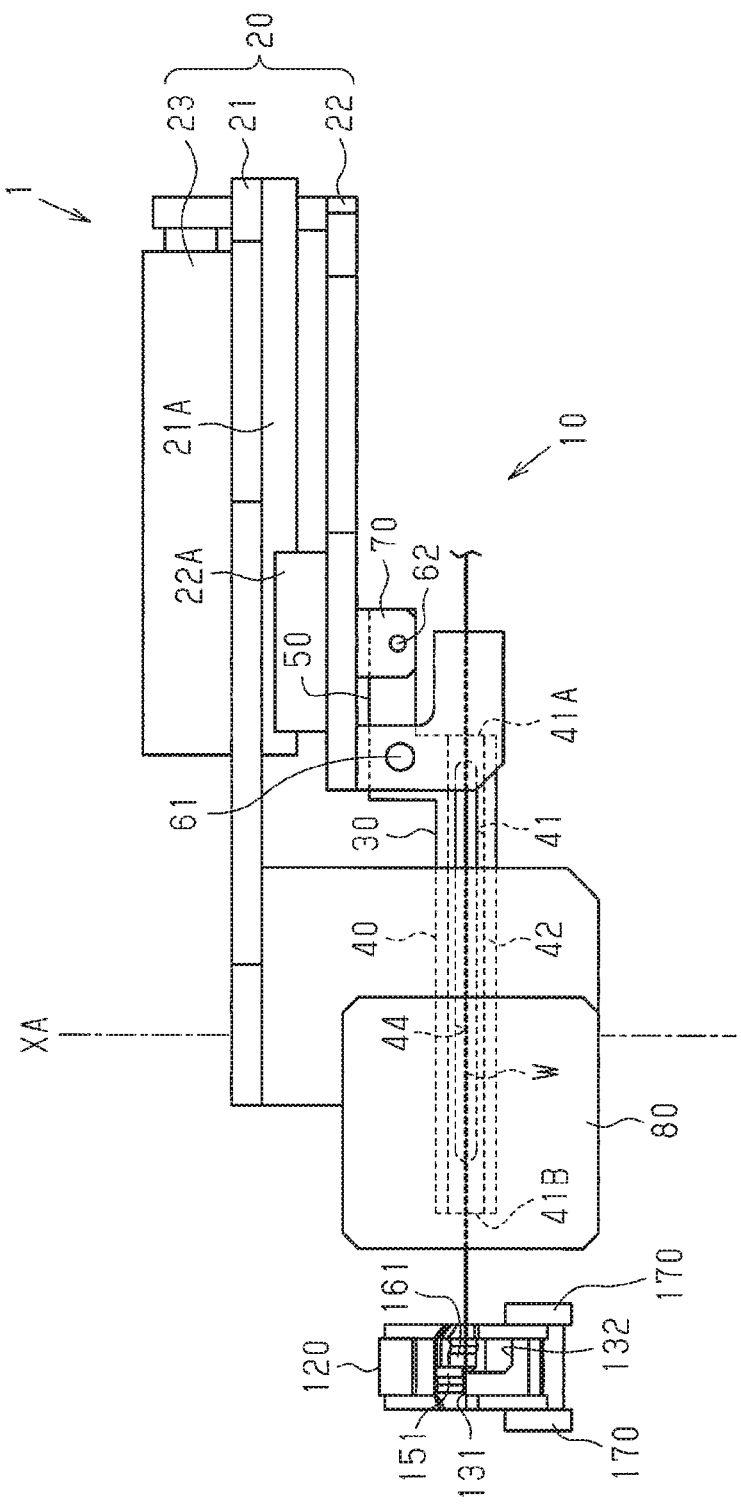
FIG. 10 is a plan view of the bead core formation apparatus when the distal end of the steel wire is located adjacent to the first base wall.

After the distal end of the steel wire W is positioned in place in the feeding direction in this manner, the piston rod 70 is retracted. This rotates the steel wire passing portion 30 about the rotation shaft 61 as shown in FIG. 10. Consequently, the distal end of the steel wire W is moved to a position adjacent to the first base wall 131 as indicated by a solid line in FIG. 8.

After the distal end of the steel wire W is moved to the position adjacent to the first base wall 131, the moving legs 170 are forced downward by the actuator (not shown). This moves the moving body 140 to the clamping position from the non-clamping position. Consequently, the first base wall 131 and the first clamp wall 151 clamp the steel wire W in between at the position corresponding to the first winding groove 111 (refer to FIG. 2). Also, the former 110 is increased in diameter.

Figure 11:
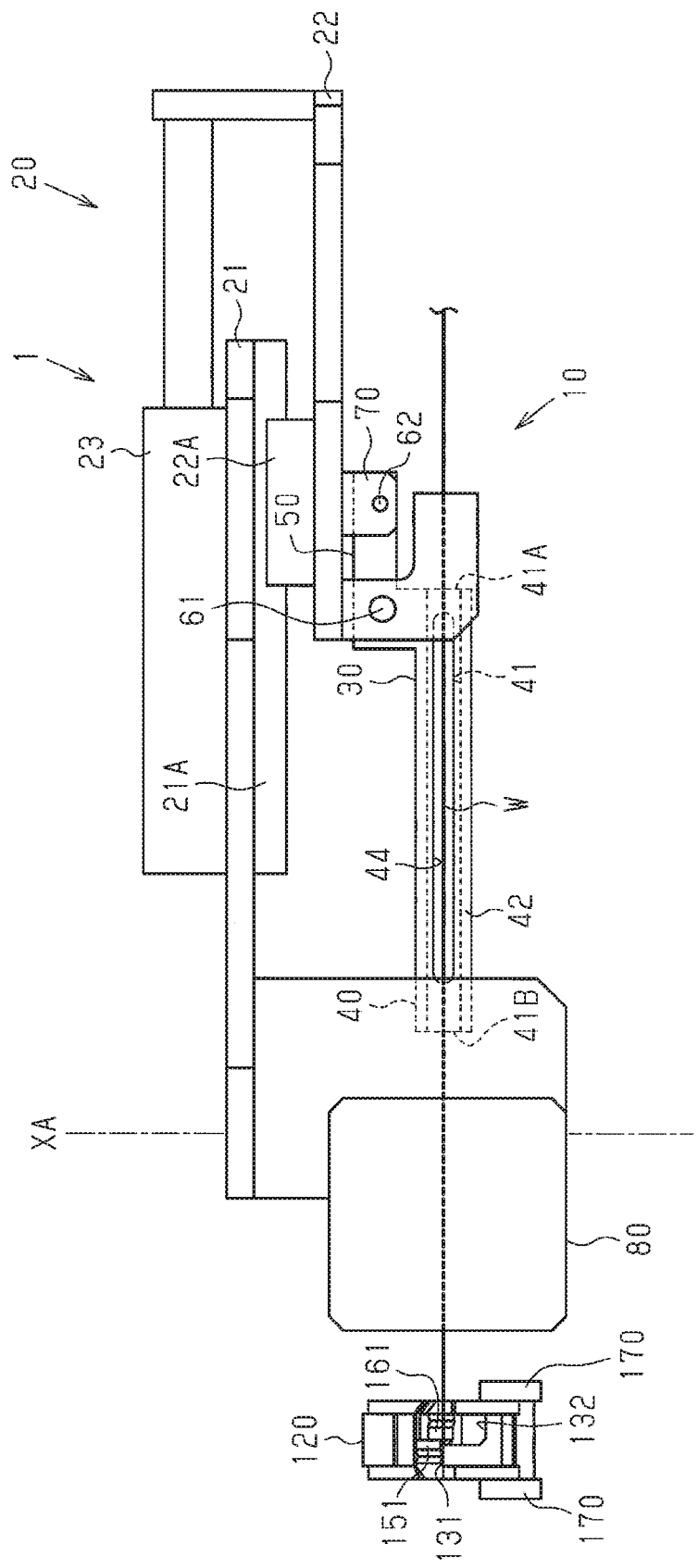
FIG. 11 is a plan view of the bead core formation apparatus when the distal end of the steel wire passing portion is moved rearward from a cutting position.

As shown in FIG. 11, when the first base wall 131 and the first clamp wall 151 clamp the steel wire W, the actuator 23 moves the second support plate 22 away from the clamping device 120. Thus, the outlet 41B of the steel wire passing portion 30 is moved rearward from the cutting position XA, which is indicated by a single-dashed line.

Then, the former 110 is rotated to wind the steel wire W around the first winding groove 111 a predetermined number of times. After the steel wire W is wound in the first winding groove 111, the cutting device 80 cuts the terminal end of the steel wire W. Also, the former 110 is reduced in diameter, and the moving body 140 is moved to the non-clamping position from the clamping position. This unclamps the distal end of the steel wire W from the clamping device 120, and a bead core that conforms to the shape of the first winding groove 111 is obtained. When the cutting device 80 cuts the terminal end of the steel wire W, that is, a portion of the steel wire W serving as the distal end of a steel wire W that is next wound around the former 110, the steel wire W is bent in the guideway 41. The bent steel wire W enters the slit 44, which is formed in the body 40. Thus, the steel wire W does not contact the inner surface of the guideway 41.

Next, the operation of the bead core formation apparatus 1 when the steel wire W is wound in the second winding groove 112 will be described.

Figure 9:
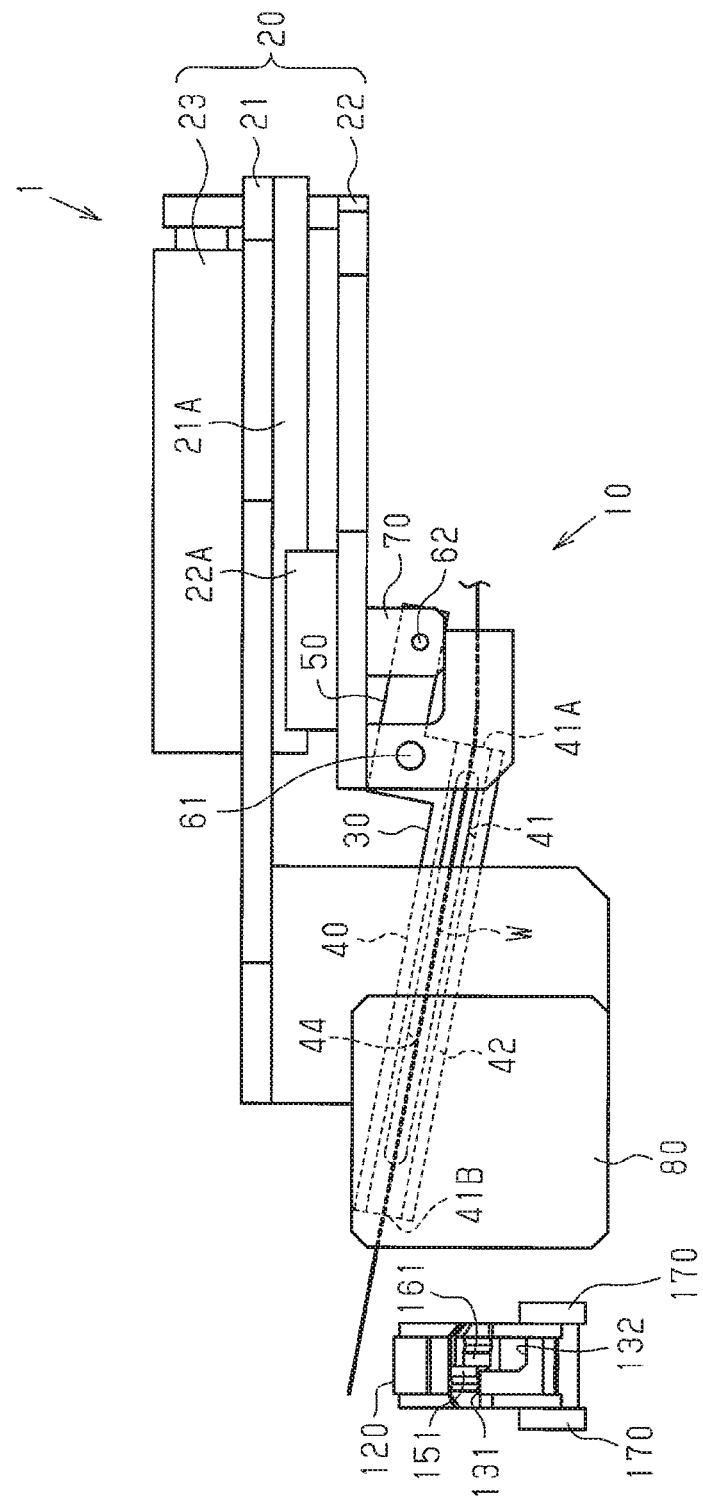
FIG. 9 is a plan view of the bead core formation apparatus of the embodiment when the steel wire passing portion is rotating the distal end of a steel wire toward the first base wall.
Figure 12:
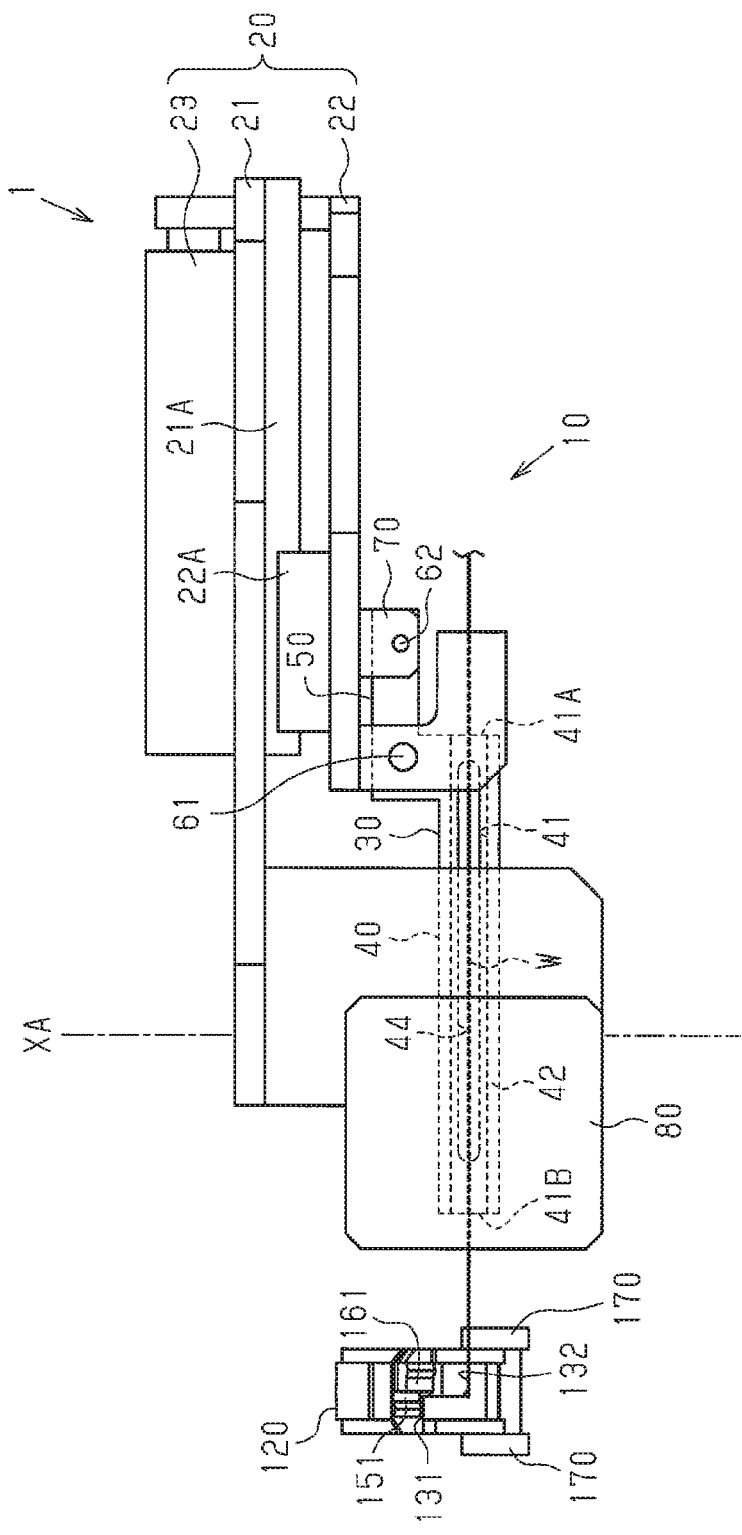
FIG. 12 is a plan view of the bead core formation apparatus when the distal end of the steel wire is located adjacent to the second base wall.

After the distal end of the steel wire W is positioned in place in the feeding direction, the piston rod 70 is retracted from the position shown in FIG. 9 to the position shown in FIG. 12. This rotates the steel wire passing portion 30 about the rotation shaft 61. Consequently, as shown in FIG. 8 with a steel wire W2 indicated by a double-dashed line, the distal end of the steel wire W is moved to a position adjacent to the second base wall 132.

After the distal end of the steel wire W is moved to the position adjacent to the second base wall 132, the moving legs 170 are forced downward by the actuator (not shown). This moves the moving body 140 to the clamping position from the non-clamping position. Consequently, the second base wall 132 and the second clamp wall 161 clamp the steel wire W in between at the position corresponding to the second winding groove 112 (refer to FIG. 2). Also, the former 110 is increased in diameter.

Figure 13:
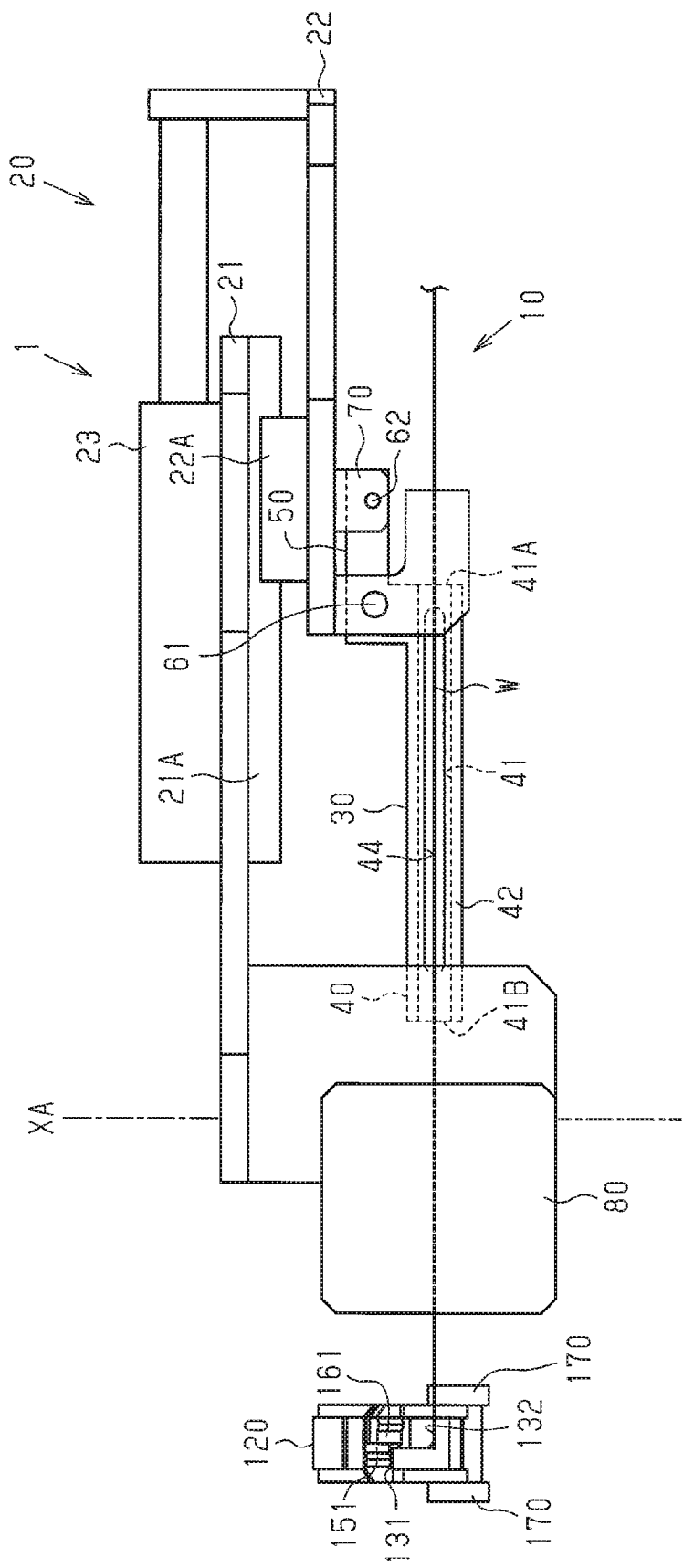
FIG. 13 is a plan view of the bead core formation apparatus when the distal end of the steel wire passing portion is moved rearward from the cutting position.

As shown in FIG. 13, when the second base wall 132 and the second clamp wall 161 clamp the steel wire W, the actuator 23 moves the second support plate 22 away from the clamping device 120. Thus, the outlet 41B of the steel wire passing portion 30 is moved rearward from the cutting position XA, which is indicated by a single-dashed line.

Then, the former 110 is rotated to wind the steel wire W around the second winding groove 112 a predetermined number of times. After the steel wire W is wound in the second winding groove 112, the cutting device 80 cuts the terminal end of the steel wire W. Also, the former 110 is reduced in diameter, and the moving body 140 is moved to the non-clamping position from the clamping position. This unclamps the distal end of the steel wire W from the clamping device 120, and a bead core that conforms to the shape of the second winding groove 112 is obtained. When the cutting device 80 cuts the terminal end of the steel wire W, that is, a portion of the steel wire W serving as the distal end of a steel wire W that is next wound around the former 110, the steel wire W is bent in the guideway 41. The bent steel wire W enters the slit 44, which is formed in the body 40. Thus, the steel wire W does not contact the inner surface of the guideway 41.

The embodiment has the advantages described below.

(1) The steel wire W does not contact the inner surface of the guideway 41 at the portion including the slit 44. This limits twisting of the steel wire W in the guideway 41.

(2) Since the twisting of the steel wire W is limited in the guideway 41, displacement of the distal end of the steel wire W from the desired position is limited. This allows the clamping device 120 to appropriately clamp the distal end of the steel wire W.

(3) The slit 44 extends in the direction in which the guideway 41 extends. This further widens the portion of the inner surface of the guideway 41 that does not contact the steel wire W. Thus, when the steel wire W passes through the guideway 41, the twisting is further limited.

(4) The inlet 41A of the guideway 41 is tapered so that the inlet 41A widens toward upstream from downstream in the feeding direction of the steel wire W. Thus, when the bent steel wire W is fed to the guideway 41, contact of the steel wire W is limited with the inlet 41A of the guideway 41. This allows for easy entrance of the distal end of the steel wire W into the guideway 41.

(5) The miniature rollers 43 are coupled to the outlet 41B of the guideway 41. This reduces friction generated when the steel wire W contacts the outlet 41B of the guideway 41. Thus, damages to the rubber coating of the steel wire W are limited.

(6) The base 50 is continuous with the end of the body 40 located close to the inlet 41A of the guideway 41. This extends the rotation radius of the steel wire passing portion 30 as compared to a structure in which the base 50 is continuous with the side surface of the body 40. This increases the movement amount of the distal end of the steel wire W per unit of rotation angle.

The above embodiment may be modified as follows.

Figure 14:
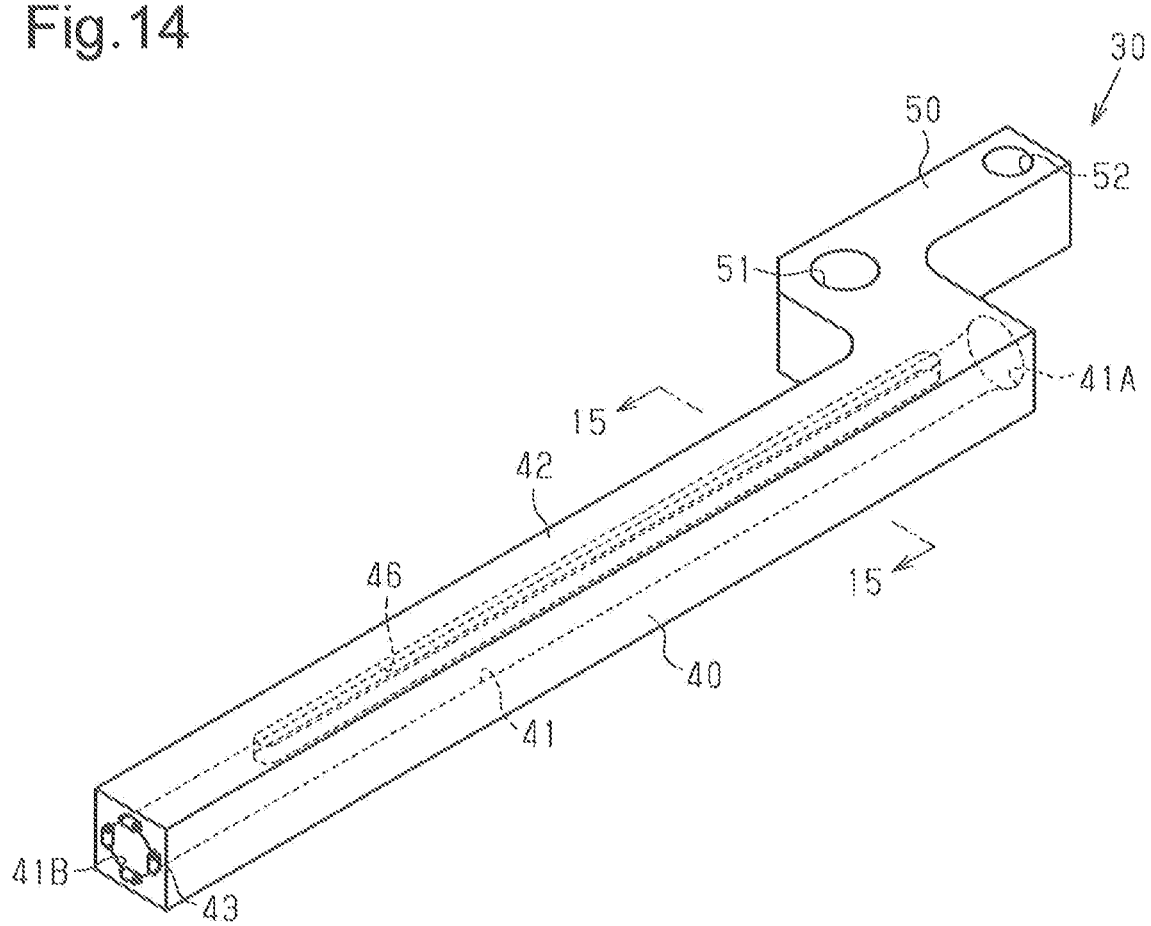
FIG. 14 is a perspective view of a steel wire passing portion illustrating a location of a recess or indentation.
Figure 15:
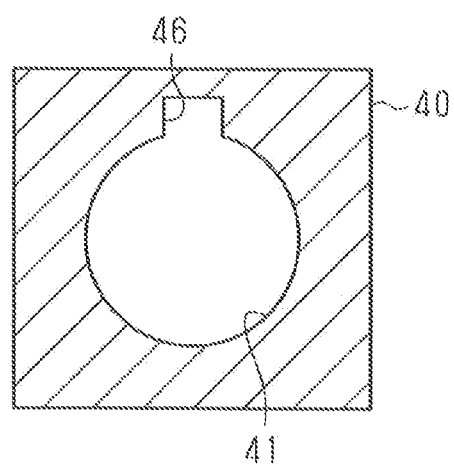
FIG. 15 is a cross section view of the steel wire passing portion illustrating the location of the recess or indentation.

The inner surface of the guideway 41 may include a recess or indentation 46 in addition to the slit 44 or instead of the slit 44, see FIGS. 14 and 15. In this structure, when the steel wire W moves through the guideway 41, contact of the steel wire W is limited with the inner surface of the guideway 41 at the portion including the recess or indentation 46. This limits twisting of the steel wire W when passing through the guideway 41. When the inner surface of the guideway 41 includes a recess or indentation 46, it is preferred that the recess or indentation 46 extends in the direction in which the guideway 41 extends.

The slit 44 may extend between the inner surface of the guideway 41 and at least one of a side surface and a lower surface of the body 40. More specifically, the slit 44 may be formed in any position of the guideway 41 corresponding to the direction in which the steel wire W is bent.

The outlet 41B of the guideway 41 may be widened toward downstream from upstream in the feeding direction of the steel wire W. In this structure, when the steel wire W is bent in conformance with the bead diameter and fed to the guideway 41, contact of the steel wire W is limited with the outlet 41B of the guideway 41. Thus, the distal end of the steel wire W easily exits from the guideway 41.

When the outlet 41B of the guideway 41 widens toward downstream from upstream in the feeding direction of the steel wire W, miniature rollers 43 may be coupled to the outlet 41B.

The base 50 may be continuous with a portion of the body 40 corresponding to the side surface.

The first base wall 131 and the first clamp wall 151 may be omitted. Alternatively, the second base wall 132 and the second clamp wall 161 may be omitted.

DESCRIPTION OF REFERENCE CHARACTERS

10 . . . guide device, 41 . . . guideway, 41A . . . inlet, 41B . . . outlet, 43 . . . miniature roller (rotation element), 44 . . . slit, W . . . steel wire.

The invention claimed is:

1. A guide device comprising:
a guideway through which a steel wire passes when the steel wire is fed to a former, wherein
the guideway includes an inner surface, and
at least a portion of the inner surface includes an indentation at a position corresponding to a direction in which the steel wire is bent.

2. The guide device according to claim 1, wherein the indentation extends in a direction in which the guideway extends.

3. The guide device according to claim 1, wherein the guideway includes an inlet that widens toward upstream from downstream in a feeding direction of the steel wire.

4. The guide device according to claim 1, wherein the guideway includes an outlet that widens toward downstream from upstream in a feeding direction of the steel wire.

5. The guide device according to claim 1, wherein the guideway includes an outlet to which a rotation element is coupled.

6. The guide device according to claim 1, wherein the indentation is adapted to limit contact of the bent steel wire with an inner portion of the guideway and to limit twisting of the steel wire in the guideway.

* * * * *